May 1, 1951 G. R. MILLER 2,551,279
MANUFACTURE OF THIN FLAT GLASS
Filed June 11, 1949 2 Sheets—Sheet 1

INVENTOR.
George R. Miller
BY
Webb, Mackey & Burden.
HIS ATTORNEYS

May 1, 1951 G. R. MILLER 2,551,279
MANUFACTURE OF THIN FLAT GLASS
Filed June 11, 1949 2 Sheets-Sheet 2
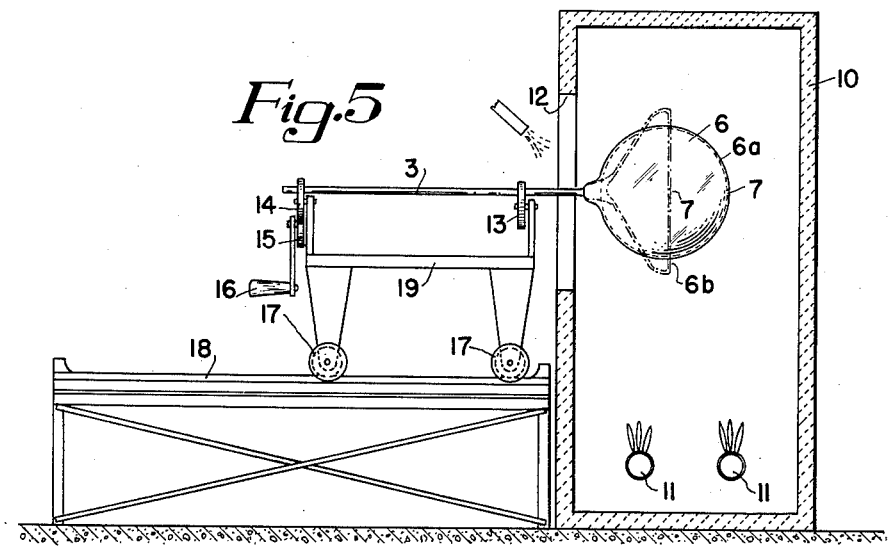
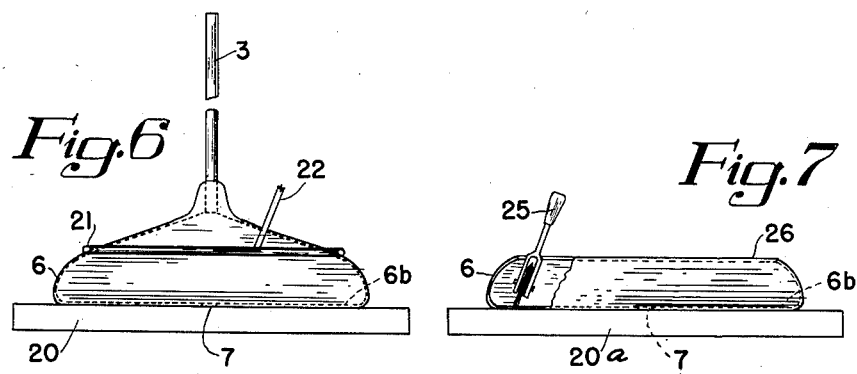
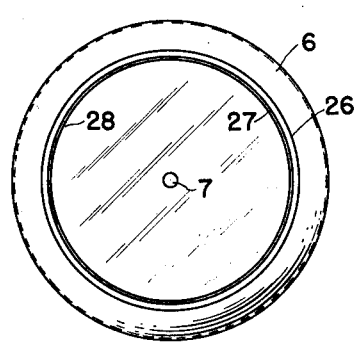
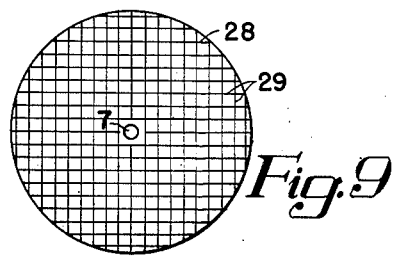
INVENTOR.
George R. Miller
BY
Webb, Mackey & Burden
HIS ATTORNEYS Patented May 1, 1951

2,551,279

UNITED STATES PATENT OFFICE 2,551,279

MANUFACTURE OF THIN FLAT GLASS

George R. Miller, Greensburg, Pa.

Application June 11, 1949, Serial No. 98,442

5 Claims. (Cl. 49—79)

This invention relates to the manufacture of thin flat glass. It is particularly applicable to the production of cover glass used to cover a specimen on a glass slide in order to examine the specimen microscopically. Cover glass ranges in thickness from about .003 inch to .014 inch. Within this range of thicknesses, cover glass is graded into four thicknesses, No. 0 being from .003 inch to .005 inch, No. 1 being from .005 inch to .007 inch, No. 2 being from .007 inch to .010 inch, and No. 3 being from .010 inch to .014 inch. The invention also is applicable to the production of thin flat glass which is somewhat thicker than cover glass, as for example glass slides for medical purposes, which may be up to .020 inch or somewhat thicker.

Cover glass, due to its thinness, shatters very easily, particularly during severing into pieces of the desired size. The greater the strain in the glass, the greater is the tendency to shatter during cutting. If the large pieces from which the small pieces are cut to form cover glass are not flat, this also makes it difficult to cut the glass without shattering. Cover glass should be of substantially uniform thickness so that all of it will fall into the desired grade instead of it being necessary to measure the thickness of the different portions and grade the pieces cut therefrom into the different grades. Prior methods for making cover glass had the objections that the glass contained considerable strains, it lacked flatness and was not uniform in thickness.

My invention provides a method of producing cover glass or other thin flat glass which is much freer from strains, is flatter and is of more uniform thickness than that obtained according to prior known methods.

In the accompanying drawings which illustrate a preferred form of the invention—

Figure 5 is a side elevation of the apparatus shown in Figure 4 and illustrating the flattening operation;

Figure 6 is a front elevation of the flattened ball and blow pipe, illustrating the capping to remove the blow pipe;

Figure 7 is a front elevation of the flattened and capped ball illustrating the scoring operation;

Figure 8 is a plan view of the capped and scored ball shown in Figure 7; and

Figure 9 is a plan view of the disc obtained according to my method, illustrating scoring lines for dividing the disc into small sections.

Figure 1:
Figure 1 is a side elevation of a blow pipe having a gob of glass adhering thereto.
Figure 2:
Figure 2 is a side elevation of the blow pipe and a hollow ball of glass blown from the gob.
Figure 3:
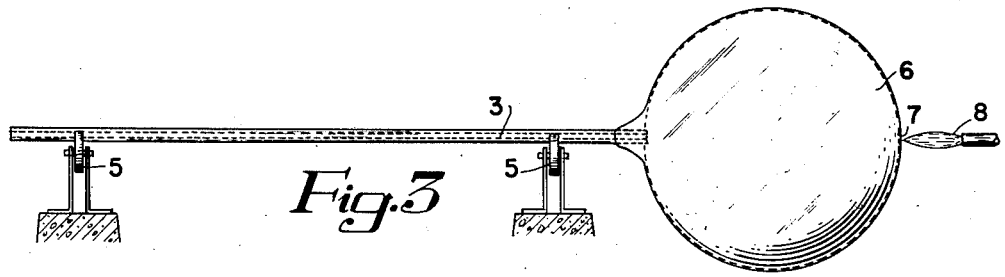
Figure 3 is a side elevation of the blow pipe and a ball of thin glass of larger diameter than that shown in Figure 2, blown from the ball shown in Figure 2 and illustrating the method of forming a small hole in the ball.

Referring more particularly to the accompanying drawings, a gob 2 of glass is gathered on the end of a blow pipe 3, this gob of glass weighing about two pounds and having a diameter of about five inches. The blow pipe and gob are rotated and while being so rotated a ball 4, which may have a diameter of about twelve inches, is blown from the gob, as shown in Figure 2. The ball 4 is then reheated and the blow pipe and ball rotated and the ball 4 is blown to a larger size to produce a ball 6, as shown in Figure 3, which may have a diameter of about twenty-four inches. A small hole 7 is then formed in the ball 6 while it is rotating by a gas flame 8 by moving either the ball or the flame toward the other. Preferably, the hole is formed in axial alignment with the blow pipe. This hole may be from about one-fourth inch to five inches in diameter, but preferably is between one-half inch and three-fourths inch in diameter. The hole 7 has the advantage of allowing pressure inside of and outside of the ball 6 to equalize, as will be explained more in detail hereinafter.

Figure 4:
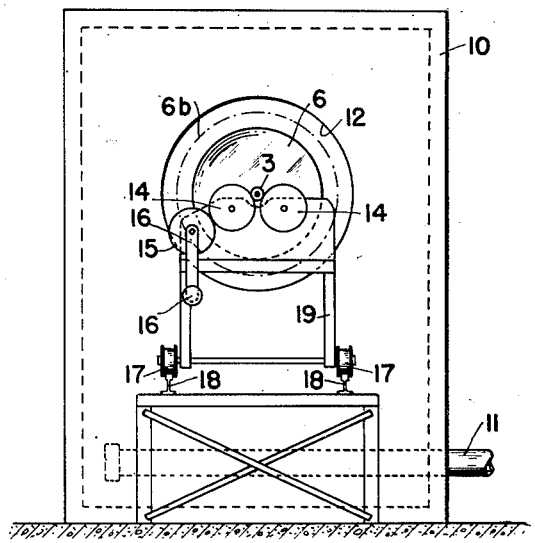
Figure 4 is a front view, somewhat diagrammatic, of a furnace and apparatus used in rotating and flattening the ball.

The ball 6 while still attached to the blow pipe 3 is then subjected to a flattening operation as illustrated in Figures 4 and 5. A furnace 10 is provided which has burners 11 at its bottom and an opening 12 at its front through which the ball 6 is introduced into the furnace. The blow pipe 3 rests on a pair of rear rollers 13 and a pair of front rollers 14 carried by a truck having wheels 17 running on rails 18. One of the front rollers 14 is driven by a friction wheel 15 and a crank 16. Thus the ball 6 can be moved into and out of the furnace 10 and rotated or spun at high speed.

The ball 6 while attached to the blow pipe is introduced into the furnace and is spun rapidly for a time sufficient to cause the glass to become plastic. This heating time is usually of the order of about one minute. The spinning and heating of the ball causes the portion 6a of the ball, including the hole 7, to flatten as indicated by the line 6b in Figure 5. When this has occurred the blow pipe and flattened ball are withdrawn from the furnace and suspended in the position shown in Figure 6 so that the flattened bottom 6b is raised only slightly above a table 20 provided with some soft covering such as cardboard. An electric wire 21 having a lead 22 adapted to be connected to a source of electric current is then placed in the position shown in Figure 6. The electric current is turned on to heat the wire, which causes the flattened ball to be severed along the line of the wire so that the blow pipe and attached part of the ball can be removed, thereby producing an article having the shape shown in Figure 7.

The flattened and capped thin glass article is then placed on a cutting table 20a and the inside of the flattened portion 6b is scored with an abrasive tool 25 by moving the tool around in a circle. In Figure 8 the upper edge of the article is designated by the reference numeral 26 and the scoring line by the reference numeral 27 which defines a disc 28. The disc 28 is removed from the remainder of the article after it is scored by exerting slight pressure with the hands against the disc and the remaining part of the article. The disc 28 is then scored as shown in Figure 9 by drawing lines 29 so as to divide the disc into the desired sized pieces. If desired, the disc 28 may be simply divided into large pieces, the portion containing the hole 7 being discarded and the large pieces shipped to the purchaser, who divides the large pieces into the desired small size.

The formation of the hole 7 in the ball 6 prior to carrying out the flattening operation insures that the pressure inside and outside of the ball will be substantially equal during flattening of the ball and cooling upon withdrawal of the flattened ball from the furnace. The hole aids in relieving strain in the flattened portion 6b, aids in making that portion flat and increasing the uniformity of its thickness, all of which are desirable properties. If the hole 7 is not formed in the ball prior to the flattening operation, then upon withdrawal of the ball from the furnace the air within the ball contracts due to cooling and the surface 6b becomes concave instead of flat. In order to overcome this concavity it is necessary to blow air into the ball through the blow pipe, but this blowing if too great causes the portion 6b to become convex instead of flat. Great skill is required in supplying just the right amount of air in order to produce a flat surface. The necessity of blowing air into the ball during its withdrawal from the furnace is overcome by my method in which the hole 7 is formed and which equalizes the pressure inside and outside of the ball. Thus relatively unskilled operators can carry out the flattening operation and yet produce thin glass which is freer from strains, is flatter and is of more uniform thickness than could be produced otherwise.

While the invention is particularly useful in the production of cover glass having a thickness between .003 inch and .014 inch, it is useful in producing thin flat glass having thicknesses up to about .020 inch.

The invention is not limited to the preferred embodiment but may be otherwise embodied or practiced within the scope of the following claims.

I claim:

1. The method of making thin flat glass, which comprises blowing a thin glass ball, forming a small hole in the ball, heating and rotating the ball to flatten a portion of it including said hole, cooling said flattened ball, and severing the flattened portion from the ball.

2. The method of making thin flat glass, which comprises gathering a gob of glass on a blow pipe, blowing a thin glass ball attached to the blow pipe, forming a small hole in the ball in substantially axial alignment with the blow pipe, heating and rotating the ball and blow pipe to flatten a portion of the ball including said hole, removing the blow pipe and ball from the source of heat and severing the flattened portion from the ball.

3. The method of making thin flat glass, which comprises gathering a gob of glass on a blow pipe, blowing a thin glass ball attached to the blow pipe, forming a small hole in the ball in substantially axial alignment with the blow pipe, heating and rotating the ball and blow pipe to flatten a portion of the ball including said hole, removing the blow pipe and ball from the source of heat, removing the blow pipe from the ball, scoring the inner surface of the flattened portion and removing it from the remainder of the ball.

4. The method of making thin flat glass, which comprises blowing a thin glass ball, forming a hole having a diameter of about one-fourth inch to five inches in the ball, heating and rotating the ball to flatten a portion of it including said hole, cooling said flattened ball, and severing the flattened portion from the ball.

5. The method of making thin flat glass, which comprises blowing a thin glass ball, forming a hole having a diameter of about one-half inch to one inch in the ball, heating and rotating the ball to flatten a portion of it including said hole, cooling said flattened ball, and severing the flattened portion from the ball.

GEORGE R. MILLER.

REFERENCES CITED

The following references are of record in the file of this patent:

UNITED STATES PATENTS

| Number | Name | Date |
|---|---|---|
| 629,555 | Fanta | July 25, 1899 |
| 1,474,403 | Chaney | Nov. 20, 1923 |
| 1,767,923 | Githler | June 24, 1930 |
| 2,178,226 | Diels | Oct. 31, 1939 |

FOREIGN PATENTS

| Number | Country | Date |
|---|---|---|
| 330,268 | Great Britain | June 4, 1930 |